United States Patent
Yamahara et al.

[11] Patent Number: 6,163,354
[45] Date of Patent: *Dec. 19, 2000

[54] LIQUID CRYSTAL DISPLAY DEVICE INCLUDING LIQUID CRYSTAL DISPLAY MATERIAL PREVENTING GENERATION OF VIEWING-ANGLE-DEPENDENT COLORATION OF DISPLAY SCREEN

[75] Inventors: Motohiro Yamahara, Osaka; Iichiro Inoue, Tenri, both of Japan

[73] Assignee: Sharp Kabushiki Kaisha, Osaka, Japan

[ * ] Notice: This patent is subject to a terminal disclaimer.

[21] Appl. No.: 08/996,956

[22] Filed: Dec. 23, 1997

[30] Foreign Application Priority Data

Dec. 24, 1996 [JP] Japan ..................... 8-343736

[51] Int. Cl.⁷ .................. G02F 1/1335; G02F 1/1347
[52] U.S. Cl. .................. 349/117; 349/75; 349/118; 349/119
[58] Field of Search .................. 349/117, 118, 349/119, 75

[56] References Cited

U.S. PATENT DOCUMENTS

| | | | |
|---|---|---|---|
| 5,142,393 | 8/1992 | Okumura et al. | 359/73 |
| 5,396,355 | 3/1995 | Wada et al. | 359/73 |
| 5,504,603 | 4/1996 | Winker et al. | 359/73 |
| 5,506,706 | 4/1996 | Yamahara et al. | 359/73 |
| 5,589,963 | 12/1996 | Gunning, III et al. | 349/119 |
| 5,599,478 | 2/1997 | Matumoto et al. | 252/249.01 |
| 5,684,551 | 11/1997 | Nakamura et al. | 349/117 |
| 5,747,121 | 5/1998 | Okazaki et al. | 428/1 |
| 5,805,253 | 9/1998 | Mori et al. | 349/118 |
| 5,855,971 | 1/1999 | Kobari et al. | 428/1 |

FOREIGN PATENT DOCUMENTS

| | | |
|---|---|---|
| 0 576 304 A1 | 12/1993 | European Pat. Off. . |
| 0 646 829 A1 | 4/1995 | European Pat. Off. . |
| 7-152028 | 6/1995 | European Pat. Off. . |
| 55-600 | 1/1980 | Japan . |
| 56-97318 | 8/1981 | Japan . |
| 5-19304 | 1/1993 | Japan . |
| 5-59365 | 3/1993 | Japan . |
| 5-215912 | 8/1993 | Japan . |
| 5-313159 | 11/1993 | Japan . |
| 8-101381 | 4/1996 | Japan . |
| WO 95/09379 | 4/1995 | WIPO . |

Primary Examiner—William L. Sikes
Assistant Examiner—Tarifur R. Chowdhury
Attorney, Agent, or Firm—David G. Conlin; David A. Tucker; Dike, Bronstein, Roberts & Cushman, LLP

[57] ABSTRACT

A liquid crystal display device of the present invention has an arrangement wherein between (a) a liquid crystal display element prepared by inserting a liquid crystal layer to a spacing between a pair of electrode substrates and (b) a pair of polarizers provided on the both sides of the liquid crystal display element, there is provided at least one phase difference plate having a negative refractive index anisotropy whose optical axis is inclined with respect to a direction normal to the surface thereof, and a change, with a wavelength of light, in the refractive index anisotropy of a liquid crystal material constituting the liquid crystal layer is set in a range which does not generate viewing-angle-dependant coloration on a liquid crystal screen. This (1) eliminates a phase difference generated in the liquid crystal display element in accordance with viewing angles and (2) effectively prevents a coloration phenomenon on the liquid crystal screen which is generated especially when the viewing angle becomes wider, thereby realizing a liquid crystal display device capable of displaying a high quality image.

23 Claims, 10 Drawing Sheets

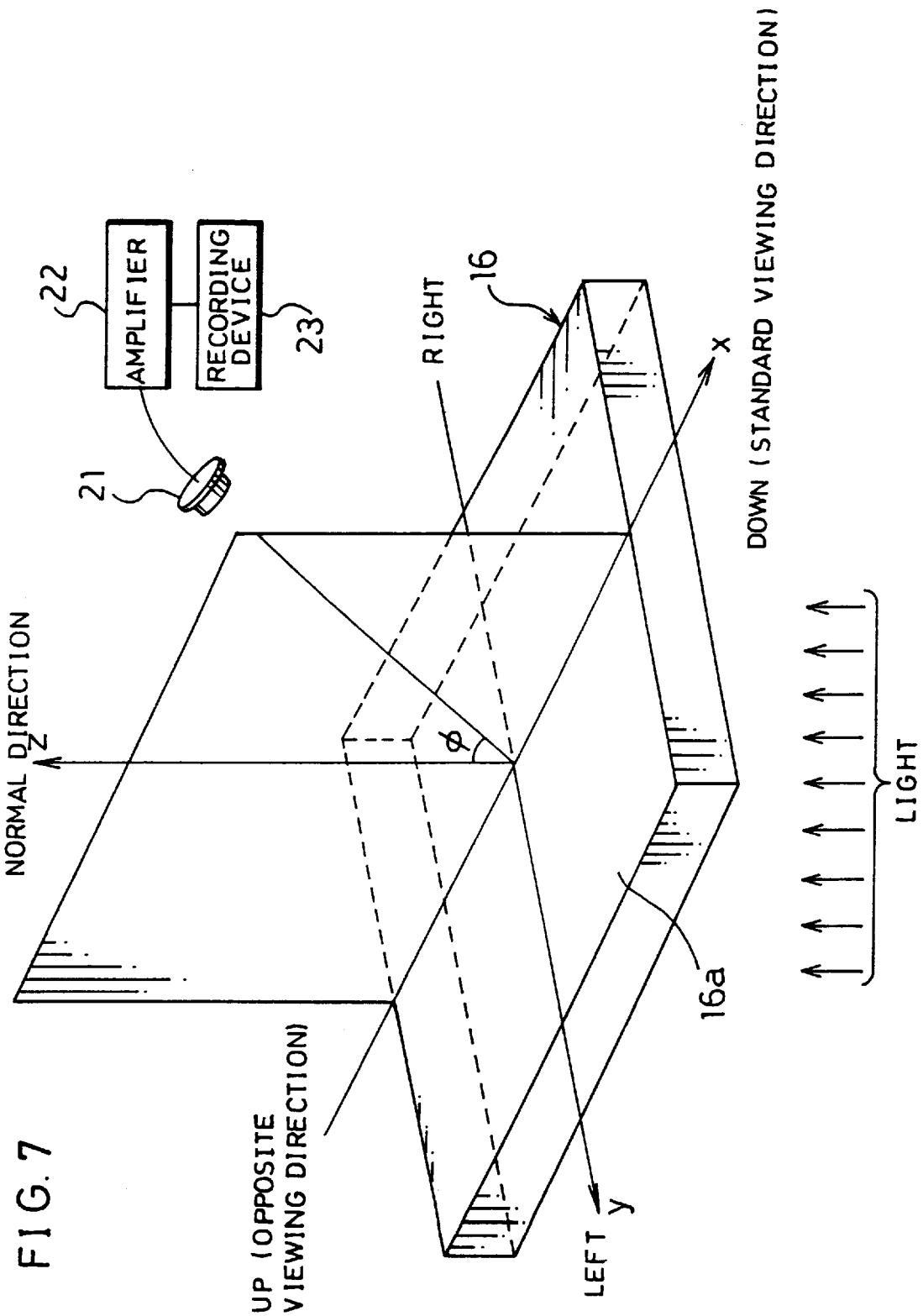

LIQUID CRYSTAL DISPLAY DEVICE INCLUDING LIQUID CRYSTAL DISPLAY MATERIAL PREVENTING GENERATION OF VIEWING-ANGLE-DEPENDENT COLORATION OF DISPLAY SCREEN

FIELD OF THE INVENTION

The present invention relates to a liquid crystal display device, and more particularly to a liquid crystal display device in which phase difference plates are combined with a liquid crystal display element so as to improve viewing-angle-dependency of a display screen.

BACKGROUND OF THE INVENTION

Liquid crystal display devices adopting nematic liquid crystal display elements, which have conventionally been widely used as numeric-value-segment-type display apparatuses such as watches and calculators, have recently been also used in word processors, note-type personal computers, car-use liquid crystal televisions, and other apparatuses.

Generally, a liquid crystal display element is provided with translucent substrates on which electrode lines for turning on or turning off pixels are formed. For example, in an active-matrix-type liquid crystal display device, active elements such as thin film transistors are provided, on the substrates together with the electrode lines, as switching means for selectively driving pixel electrodes which apply a voltage to liquid crystal. Also, in a liquid crystal display device which carries out color displaying, color filter layers of red, green, and blue are provided on the substrates.

The liquid crystal display element such as above adopts a liquid crystal displaying system which is suitably selected in accordance with the twist angle of the liquid crystal. For example, the active-driving-type twisted nematic liquid crystal displaying system (hereinafter, referred to as the TN system) and the multiplex-driving-type super-twisted nematic liquid crystal display system (hereinafter, referred to as the STN system) are widely known.

In the TN system, displaying is carried out by aligning nematic liquid crystal molecules in a 90° twist, and a ray of light is directed along the twisted direction. In the STN system, displaying is carried out by taking an advantage of the fact that the transmittance suddenly changes in a vicinity of the threshold value of a voltage applied to the liquid crystal when the twist angle of the nematic liquid crystal molecules is made larger than 90°.

Since the STN system utilizes the birefringence effect of the liquid crystal, on the background of the display screen, a distinct color is generated due to interference of colors. In order to overcome such a problem so as to realize black-and-white displaying in the STN system, it is effective to use an optical-retardation compensation plate. A displaying system adopting the optical-retardation compensation plate can be roughly classified into two displaying systems: (1) The double layered super-twisted nematic optical-retardation compensation system (hereinafter, referred to as the DSTN system) and (2) the film-type optical-retardation compensation system (hereinafter, referred to as the film-addition-type system) in which a film having optical anisotropy is provided.

In the DSTN system, a double-layered structure is adopted wherein (1) a displaying-use liquid crystal cell and (2) a liquid crystal cell which is twist-aligned by a twist angle in a direction opposite to that of the displaying-use liquid crystal cell are provided. In contrast, the film-addition-type system adopts an arrangement wherein a film having optical anisotropy is provided. Of the two systems, the film-addition-type system is considered to be more prospective from the standpoint of light weight and low costs. Since the application of such optical-retardation compensation systems makes it possible to improve the black-and-white display characteristics, color STN liquid crystal display devices capable of color displaying have been realized by means of providing a display device of the STN system with color-filter layers.

The TN system can be roughly classified into (1) a normally-white system and (2) a normally-black system. In the normally-black system, a pair of polarization plates are positioned so that the respective polarization axes thereof are parallel to each other so as to display black during a state in which no voltage is applied to the liquid crystal layer (off state). In the normally-white system, a pair of polarization plates are positioned so that the respective polarization axes thereof are orthogonal to each other so as to display white during the off state. The normally-white system is considered to be more prospective from the standpoint of a display contrast, color reproducibility, and viewing-angle-dependency of the display, etc.

Incidentally, the described TN liquid crystal display device has a problem of increased viewing-angle-dependency in that the contrast of a displayed image is changed depending on the direction in which and the angle by which the displayed image is observed by the observer, due to the fact that (1) the liquid crystal molecules exhibit refractive index anisotropy $\Delta n$ and (2) the alignment direction of the liquid crystal molecules is tilted with respect to the substrates.

FIG. 10 schematically shows a cross sectional arrangement of a TN liquid crystal display element 31. The arrangement of FIG. 10 is induced by the application of a voltage for half-tone displaying so that a liquid crystal molecule 32 slants upward slightly. In the liquid crystal display element 31, (1) linearly polarized light 35 passing through the TN liquid crystal display element 31 in a direction parallel to the direction normal to the surfaces of substrates 33 and 34 and (2) linearly polarized light 36 and 37 respectively passing through the TN liquid crystal display element 31 in directions inclined with respect to the normal direction cross the liquid crystal molecule 32 at different angles. Thus, since the liquid crystal molecule 32 exhibits refractive index anisotropy $\Delta n$, when the linearly polarized light 35, 36, and 37 transmit through the liquid crystal molecule 32 in the respective directions, ordinary light and extraordinary light are generated. As a result, the linearly polarized light 35, 36 and 37 are respectively converted into elliptically polarized light according to a phase difference between the ordinary light and the extraordinary light. This is the cause of the viewing-angle-dependency.

Further, in an actual liquid crystal layer, the liquid crystal molecule 32 has different tilt-angles (a) in a vicinity of a midway portion of the substrate 33 and the substrate 34 and (b) in respective vicinities of the substrate 33 and the substrate 34. Also, the liquid crystal molecule 32 is twisted by 90° about the axis (normal direction).

As described, the linearly polarized light 35, 36, and 37 passing through the liquid crystal layer are subjected to various birefringence effects depending on the direction or the angle of the travel. This results in complex viewing-angle-dependency.

Specifically, as such viewing-angle-dependency, the following phenomena are observed. When the viewing direction is inclined towards the standard viewing direction, i.e., the downward direction of the display surface, from the direction normal to the display screen, above a certain angle, (1) coloring of the displayed image is observed (hereinafter referred to as coloration phenomenon) and (2) the black and white of the displayed image is reversed (hereinafter referred to as reversion phenomenon). Also, when the viewing angle is inclined towards the opposite viewing direction, i.e., the upward direction of the display screen, sudden lowering of the contrast is observed.

Further, the described liquid crystal display device has a drawback in that the viewing angle becomes smaller with an increase in size of the display screen. When a large liquid crystal display screen is viewed from the front with a close distance, there is a case where different colors are observed in a displayed image on the upper portion and the lower portion of the display screen due to the effect of the viewing-angle-dependency. This is caused by a wider range of viewing angle required to encompass the entire screen surface, which is equivalent of a viewing direction increasingly far off-center.

In order to improve such viewing-angle-dependency, for example, Japanese Laid-Open Patent Applications No. 55-600/1980 (Tokukaisho 55-600) and No. 56-97318/1981 (Tokukaisho 56-97318) suggest an arrangement wherein a phase difference plate (phase difference film) having optical anisotropy is inserted as an optical element between the liquid crystal display element and one of the polarization plates.

In this arrangement, the light, having converted to elliptically polarized light from linearly polarized light in the course of its passage through the liquid crystal molecules having refractive index anisotropy, is allowed to pass through the phase difference plate. This ensures that the change in the phase difference of the ordinary light and the extraordinary light with viewing angles is compensated so that the elliptically polarized light is converted again back to the linearly polarized light, thereby permitting the viewing-angle-dependency to be improved. Note that, the phase difference plate is provided on a side or on the both sides of the liquid crystal layer having refractive index anisotropy.

As such a phase difference plate, for example, Japanese Laid-Open Patent Application No. 5-313159/1993 (Tokukaihei 5-313159) discloses a phase difference plate wherein one of the principal refractive index directions of a refractive index ellipsoid is made parallel to the direction normal to the surface of the phase difference plate. However, even with this phase difference plate, there is a limit in suppressing the reversion phenomenon in the standard viewing direction.

In order to overcome this limit, U.S. Pat. No. 5,506,706 (corresponding to Japanese Laid-Open Patent Application No. 6-75116/1994 (Tokukaihei 6-75116)) suggest a phase difference plate having an arrangement wherein the principal refractive index direction of the refractive index ellipsoid is inclined with respect to the direction normal to the surface of the phase difference plate. As a phase difference plate having this, two types of phase difference plates ① and ② are suggested.

① In this phase difference plate, of three principal refractive indices of the refractive index ellipsoid, the direction of the smallest refractive index is made parallel to the surface of the phase difference plate, and the direction of one of the remaining refractive indices is inclined by an angle θ with respect to the surface of the phase difference plate, and the direction of the other remaining refractive index is also inclined by the angle θ with respect to a direction normal to the phase difference plate, wherein the value of θ satisfies the condition $20° \leq \theta \leq 70°$.

② In this phase difference plate, three principal, refractive indices $n_a$, $n_b$, and $n_c$ of the refractive, index ellipsoid are related to each other by the relation $n_a = n_c > n_b$, and (1) the direction of the principal refractive index $n_b$ parallel to the direction normal to the surface of the phase difference plate and (2) the direction of the principal refractive index $n_a$ or $n_c$ on the surface of the phase difference plate are inclined in a clockwise direction or in a counterclockwise direction about the direction of the principal refractive index $n_a$ or $n_c$ on the surface of the phase difference plate. Namely, the refractive index ellipsoid is inclined with respect to the phase difference plate.

In the two types of the phase difference plates ① and ②, the former can adopt a phase difference plate of either a uniaxial type or a biaxial type. On the other hand, the latter can adopt an arrangement wherein two phase difference plates are provided in a pair instead singly, and the inclined direction of the principal refractive index $n_b$ of each of the pair of phase difference plates is set to 90°.

In a liquid crystal display device having an arrangement wherein at least one such phase difference plates is provided between the liquid crystal display element and the polarization plates, it is possible to suppress to some degree the change in contrast, the coloration phenomenon, and the reversion phenomenon.

However, due to a demand for a liquid crystal display device having a wider viewing angle and a higher displaying quality in today's market, a further advancement in improving the viewing-angle-dependency is demanded, and therefore the phase difference plates disclosed in the above-mentioned U.S. patents are not sufficient for meeting such a demand. Thus, there is a room for further improvements.

SUMMARY OF THE INVENTION

It is an object of the present invention to provide a liquid crystal display device in which, in addition to the compensation effect of phase difference plates, the viewing-angle-dependency is improved more desirably by setting an optimum range for a change, with a wavelength of light, in refractive index anisotropy Δn of a liquid crystal material constituting a liquid crystal layer, and in which a coloration phenomenon is effectively improved in particular.

In order to achieve the above-mentioned object, a liquid crystal display device in accordance with the present invention includes a pair of translucent substrates, each provided with a transparent electrode layer and an alignment layer on a surface facing the other substrate, a liquid crystal layer made of a liquid crystal material whose change in refractive index anisotropy in accordance with a wavelength of light is set in a range which does not allow viewing-angle-dependant coloration to generate on a liquid crystal screen, a liquid crystal display element composed of the pair of translucent substrates and the liquid crystal layer, a pair of polarizers provided on both sides of the liquid crystal display element, and phase difference plates, provided at least one, respectively positioned between the liquid crystal display element and the pair of polarizers.

With this arrangement, in the case where linearly polarized light, upon passing through the liquid crystal layer showing birefringence, is converted into elliptically polarized light in accordance with a phase difference of ordinary light and extraordinary light generated in this process, since the phase difference plates are provided between the liquid crystal display element and the pair of polarizers, a change in the phase difference of the ordinary light and the extraordinary light generated in accordance with viewing angles is compensated by the phase difference plates.

However, the compensation of the phase difference by the phase difference plates is not sufficient when more desirable improvement of the viewing-angle-dependency is demanded.

In order to meet such a demand, after extensive research, inventors of the present invention found that a change, with a wavelength of light, in the refractive index anisotropy $\Delta n$ of the liquid crystal material constituting the liquid crystal layer plays a major role in affecting the coloration of a liquid crystal screen (display screen) in particular. This finding led to the present invention.

In the liquid crystal display device of the present invention, a change, with a wavelength of light, in the refractive index anisotropy $\Delta n$ of the liquid crystal material constituting the liquid crystal layer sealed in the liquid crystal display element is set in a range which does not allow viewing-angle-dependant coloration to generate on a liquid crystal screen, thereby preventing the generation of coloration on the screen. Note that, with this arrangement, it is also possible to further suppress a change in contrast and a reversion phenomenon, compared with the case of relying solely on the compensation effect of the phase difference plates.

Also, by adopting, as the described phase difference plates, a phase difference plate whose three principal refractive indices $n_a$, $n_b$, and $n_c$ are related to each other by the relation $n_a = n_c > n_b$, and the principal refractive index $n_b$ is inclined with respect to the direction normal to the surface of the phase difference plate, it is possible to further reduce the change in the phase difference of the ordinary light and the extraordinary light generated in accordance with viewing angles. Note that, in this phase difference plate, (1) the direction of the principal refractive index $n_b$ parallel to the direction normal to the surface of the phase difference plate and (2) the direction of the principal refractive index $n_a$ or $n_c$ on the surface of the phase difference plate are inclined in a clockwise direction or in a counterclockwise direction about the direction of the principal refractive index $n_a$ or $n_c$ on the surface of the phase difference plate. Namely, the refractive index ellipsoid formed by the three principal refractive indices $n_a$, $n_b$, and $n_c$ is inclined.

For a fuller understanding of the nature and advantages of the invention, reference should be made to the ensuing detailed description taken in conjunction with the accompanying drawings.

BRIEF DESCRIPTION OF THE DRAWINGS

FIG. 7 is a perspective view schematically showing a measuring system which measures viewing-angle-dependency of the liquid crystal display device.

DESCRIPTION OF THE EMBODIMENTS

The following will describe one embodiment of the present invention referring to the attached drawings.

Figure 1:
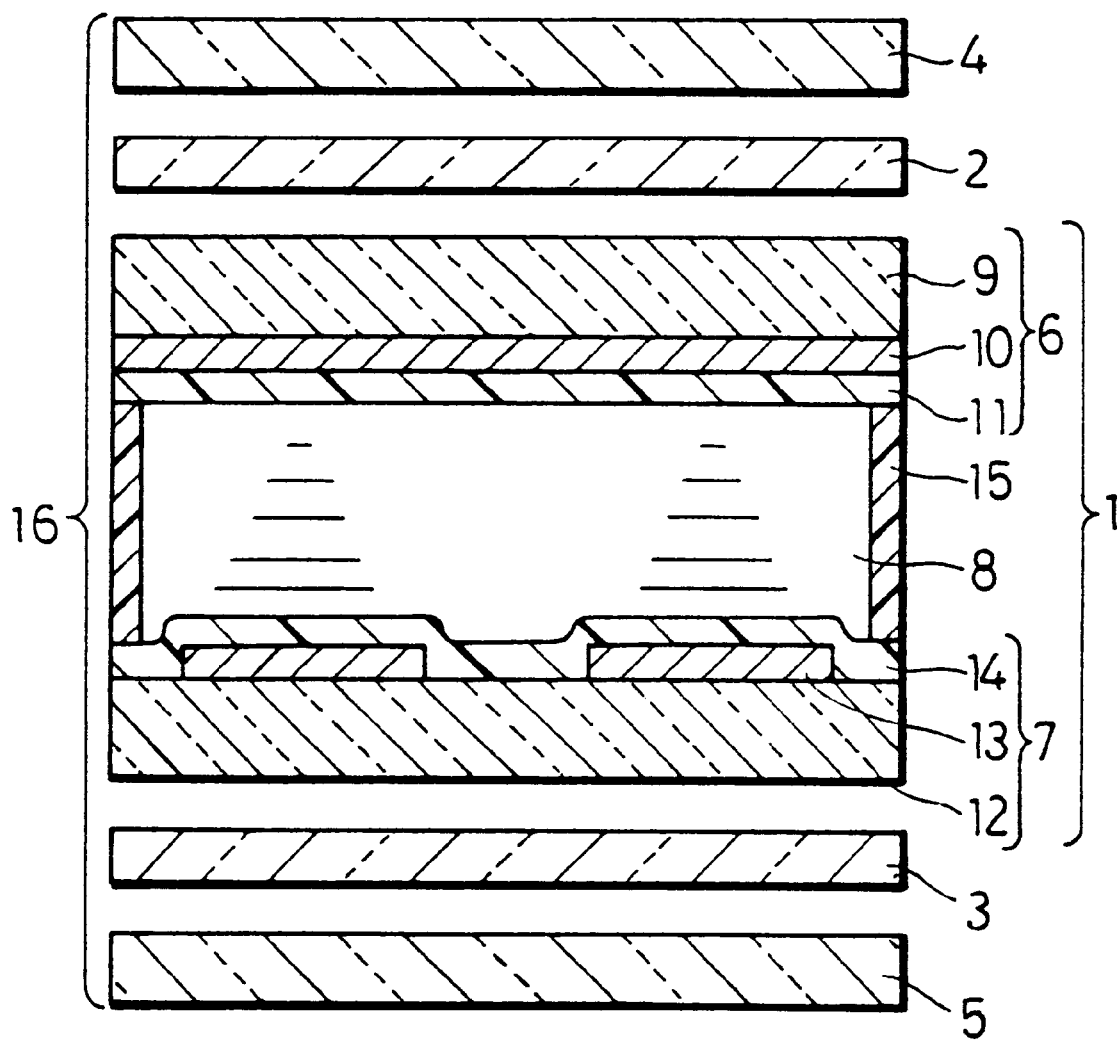
FIG. 1 is a cross sectional view showing a separated arrangement of a liquid crystal display device in accordance with one embodiment of the present invention.

As shown in FIG. 1, a liquid crystal display device of the present embodiment is provided with a liquid crystal display element 1, a pair of phase difference plates 2 and 3, and a pair of polarization plates (polarizer) 4 and 5.

The liquid crystal display element 1 has a structure wherein a liquid crystal layer 8 is sandwiched between electrode substrates 6 and 7 which are provided so as to face each other. An electrode substrate 6 has an arrangement wherein transparent electrodes 10 made of ITO (Indium-Tin-Oxide) are formed on the surface, on the side of the liquid crystal layer 8, of a glass substrate (translucent substrate) 9 which is provided as a base, and an alignment layer 11 is formed on the transparent electrodes 10 thus provided. In the same manner, an electrode substrate 7 has an arrangement wherein transparent electrodes 13 made of ITO (Indium-Tin-Oxide) are formed on the surface, on the side of the liquid crystal layer 8, of a glass substrate (translucent substrate) 12 which is provided as a base, and an alignment layer 14 is formed on the transparent electrodes 13 thus provided.

For simplicity, FIG. 1 shows an arrangement of the liquid crystal display element 1 of only two pixels, yet in the entire arrangement of the liquid crystal display element 1, the strip-shaped transparent electrodes 10 and 13 respectively having predetermined widths are respectively provided on the glass substrates 9 and 12 with predetermined spaces so as to be orthogonal to each other when viewed from a direction perpendicular to the surface of the substrate. Each portion where the transparent electrodes 10 and 13 intersect makes up a pixel for displaying, and the pixels are provided in matrix over the entire liquid crystal display device of the present embodiment. Note that, to the transparent electrodes 10 and 13, a voltage in accordance with display data is applied by a driving circuit (not shown).

The electrode substrates 6 and 7 are combined with each other by seal resin 15, and the liquid crystal layer 8 is enclosed in a spacing formed by the electrode substrates 6 and 7 and the seal resin 15. Note that, although detailed explanations will be given later, as a liquid crystal material of the liquid crystal layer 8, such a material is selected so that its refractive index anisotropy $\Delta n$ satisfies a predetermined condition for producing the most desirable property out of the combination of (1) the liquid crystal layer 8 of the present liquid crystal display device and (2) the compensation function of the phase difference by the phase compensation plates 2 and 3.

In the present liquid crystal display device, a unit composed of the liquid crystal display element 1, the phase compensation plates 2 and 3, and the polarization plates (polarizer) 4 and 5 constitutes a liquid crystal cell 16.

Figure 2:
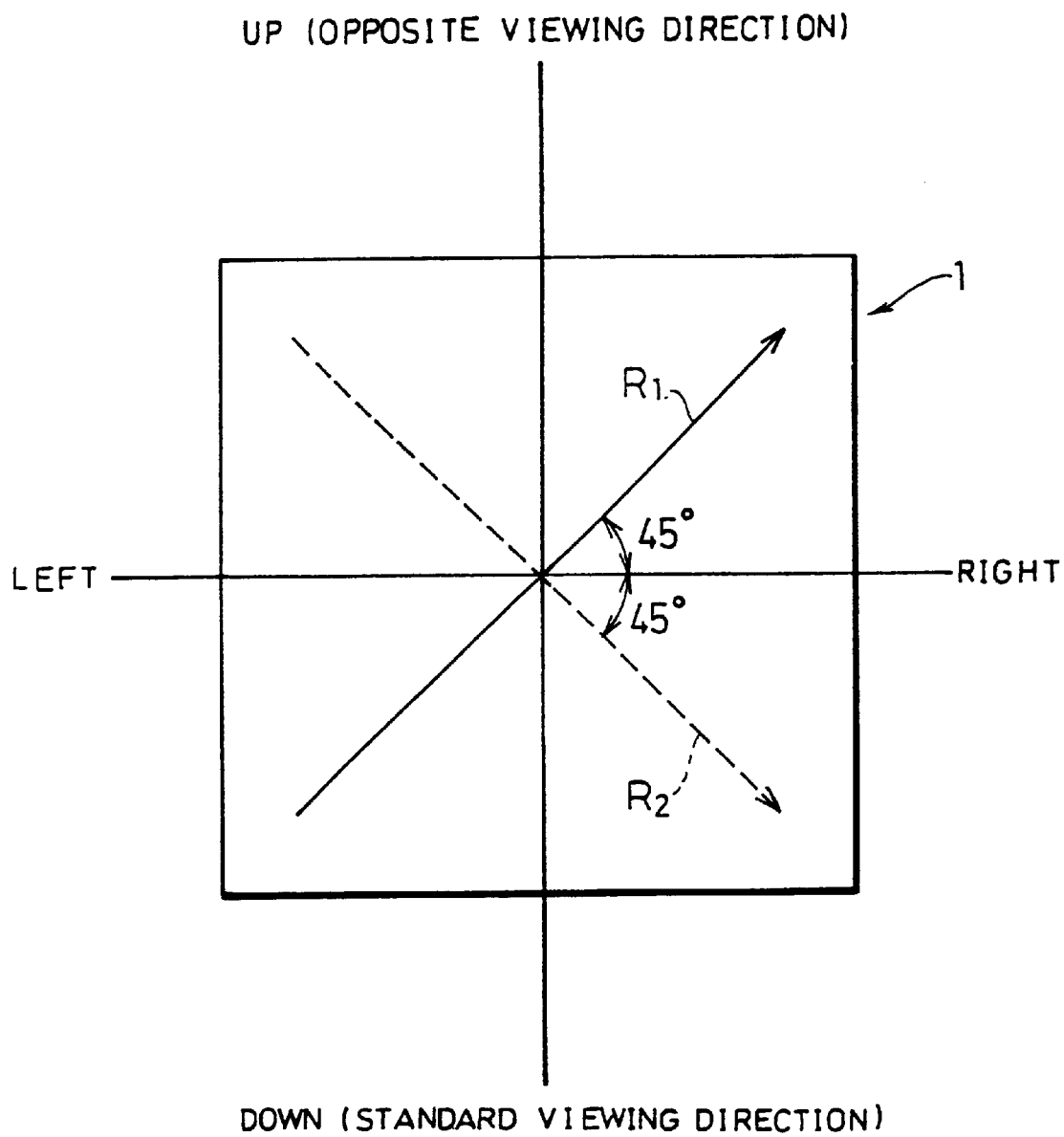
FIG. 2 is an explanatory drawing showing a relation between a rubbing direction of an alignment layer and a standard viewing direction in the liquid crystal display device.

The alignment layers 11 and 14 are subjected to a rubbing process beforehand so that the liquid crystal molecules therebetween align in a 90° twist. As shown in FIG. 2, the rubbing direction $R_1$ and the rubbing direction $R_2$ of the alignment layer 11 are set so as to be orthogonal to each other. Note that, the direction rotated counterclockwise by 45° with respect to the rubbing direction $R_1$ is an opposite viewing direction, and the direction opposite to the opposite viewing direction is a standard viewing direction.

The phase difference plate 2 is provided between the liquid crystal display element 1 and the polarization plate 4, and the phase difference plate 3 is provided between the liquid crystal display element 1 and the polarization plate 5. The phase difference plates 2 and 3 are prepared by (1) tilt-aligning or hybrid-aligning discotic liquid crystal on a support base made of a transparent organic polymer and (2) crosslinking of the discotic liquid crystal to each other. As a result, refractive index ellipsoids of the phase difference plates 2 and 3 are tilted with respect to the phase difference plates 2 and 3.

As the support base of the phase difference plates 2 and 3, triacetylcellulose (TAC), which is generally adopted as a polarization plate, is suitably adopted due to its reliability. Alternatively, it is also possible to adopt a colorless transparent organic polymer film having high weather resistance and chemical resistance such as polycarbonate (PC) or polyethyleneterephthalate (PET).

Figure 3:
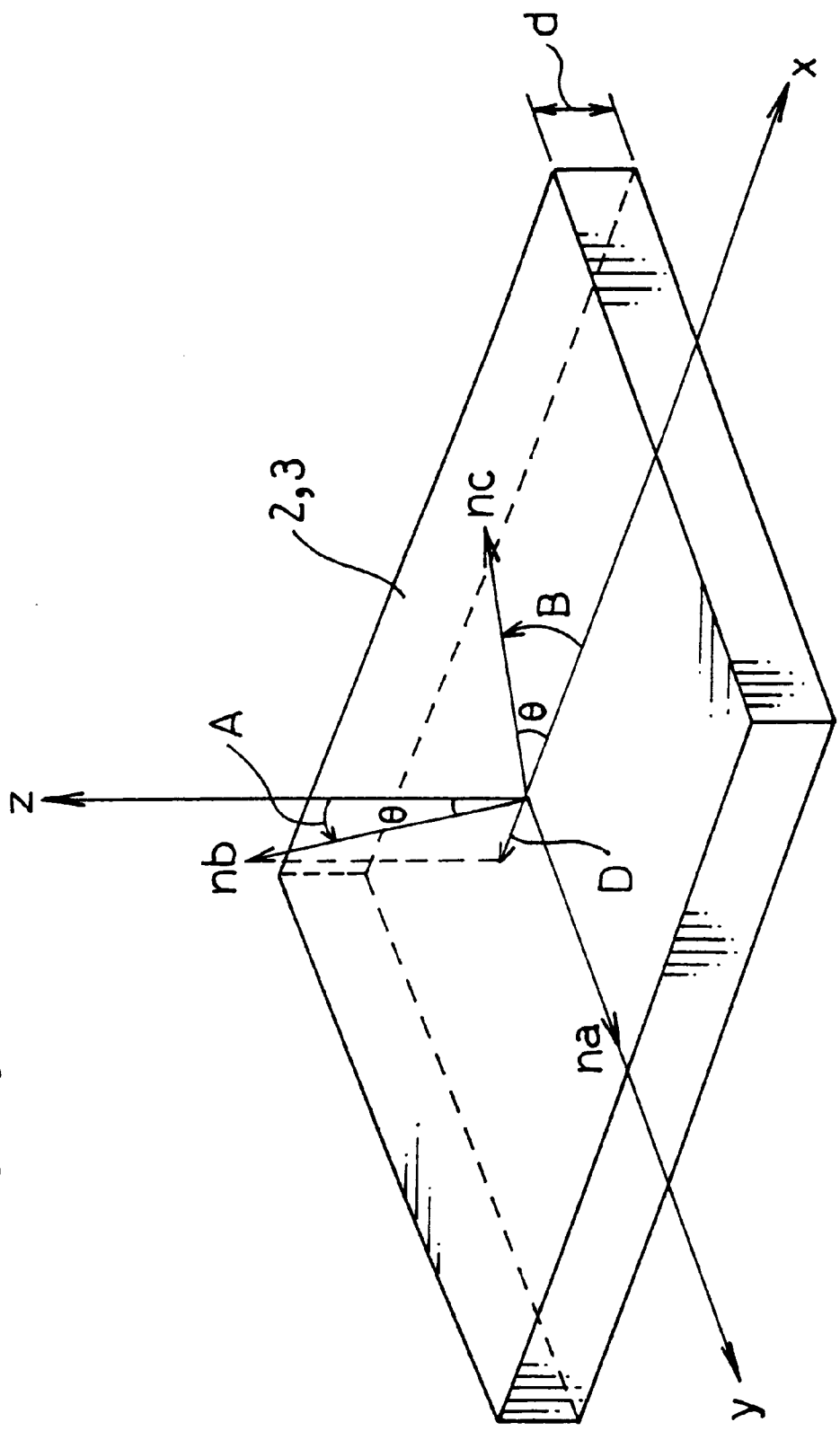
FIG. 3 is a perspective view showing principal refractive indices of a phase difference plate of the liquid crystal display device.

As shown in FIG. 3, the phase difference plates 2 and 3 respectively have principal refractive indices of $n_a$, $n_b$, and $n_c$ in three different directions. The principal refractive index $n_a$ coincides with the extended direction of the y-axis of the rectangular coordinates of x, y, and z. The principal refractive index $n_b$ is inclined by an angle θ in a direction of the arrow A on the x-z plane with respect to the z-axis perpendicular to the surface of the phase difference plate 2 or 3 corresponding to the screen (direction normal to the surface). In the same manner, the principal refractive index $n_c$ is inclined by an angle θ in a direction of the arrow B on the x-z plane with respect to the x-axis.

In the phase difference plates 2 and 3, the principal refractive indices $n_a$, $n_b$, and $n_c$ satisfy the relation $n_a=n_c>n_b$, and therefore only one optical axis is present. Thus, the phase difference plates 2 and 3 are uniaxial, and the refractive index anisotropy is negative. Here, since $n_a=n_c$, a first retardation value of the phase difference plates 2 and 3 is substantially 0 nm (($n_c-n_a$)×d=0), and a second retardation value, derived from the formula ($n_c-n_b$)×d, is set to have an arbitrary value in a range of 80 nm and 250 nm. By setting the second retardation value in this range, it is ensured that the compensation function of the phase difference by the phase difference plates 2 and 3 is obtained. Note that, ($n_c-n_a$) and ($n_c-n_b$) respectively denote refractive index anisotropy Δn, and "d" denotes the thickness of the phase difference plate 2 or 3.

Also, the angle θ by which the principal refractive index $n_b$ of the phase difference plates 2 and 3 is inclined, namely, the tilt-angle θ of the refractive index ellipsoid is set to have an arbitrary value in a range of 15°≦θ≦75°. By setting the tilt-angle θ of the refractive index ellipsoid in this range, it is ensured that the compensation function of the phase difference by the phase difference plates 2 and 3 is obtained, regardless of the direction (clockwise or counterclockwise) the refractive index ellipsoid is inclined with respect to the x-y plane.

Note that, with regard to the positioning of the phase difference plates 2 and 3, it is possible to arrange the phase difference plates 2 and 3 in such a manner that (a) only one of the phase difference plates 2 and 3 is provided on one side of the liquid crystal display element 1, (b) the phase difference plates 2 and 3 are both provided on one side of the liquid crystal display element 1 in an overlapped manner, or (c) three or more phase difference plates are provided.

Figure 4:
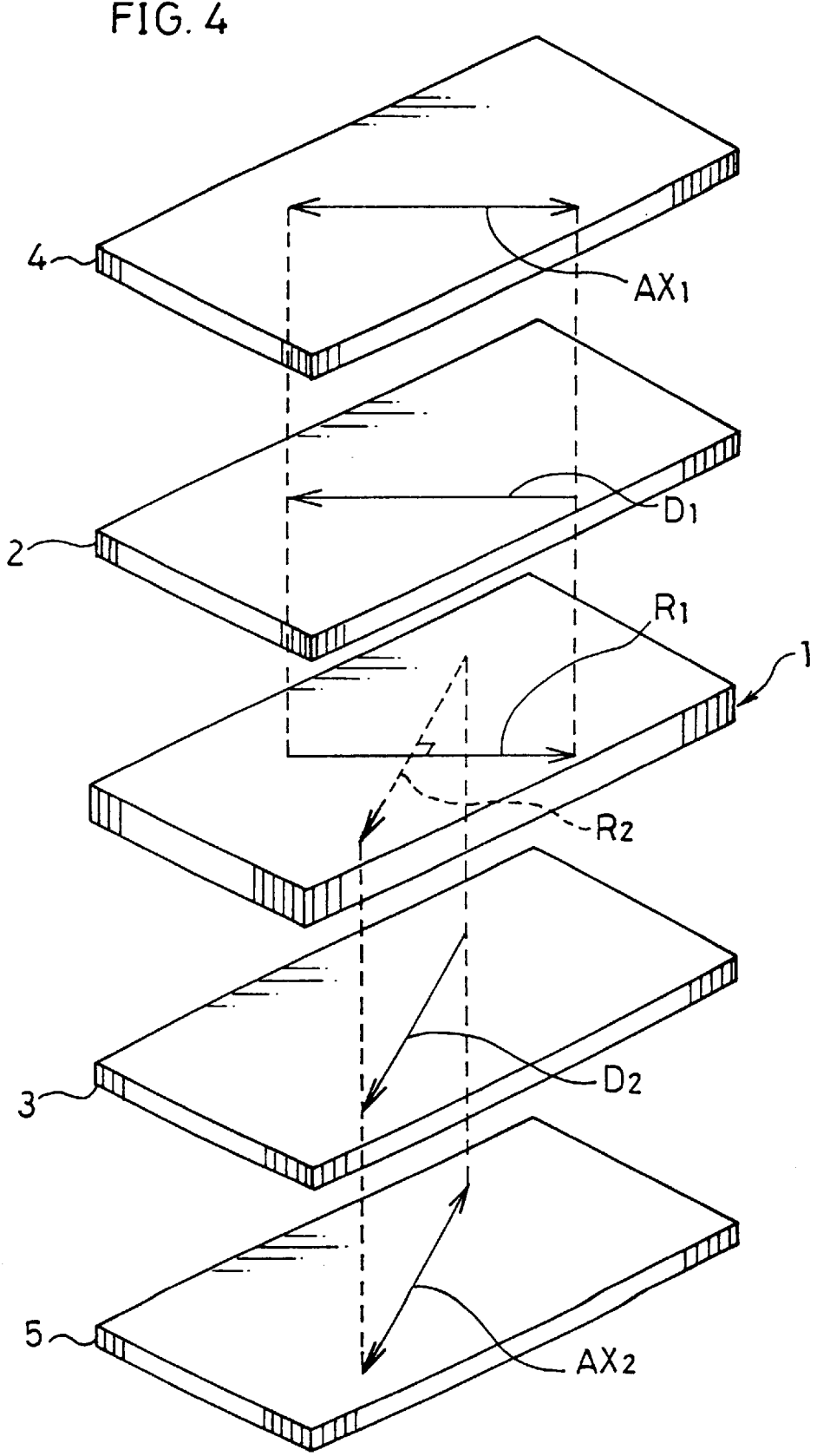
FIG. 4 is a perspective view of separated components of the liquid crystal display device showing an optical arrangement of polarization plates and phase difference plates of the liquid crystal display device.

In the present liquid crystal display device, as shown in FIG. 4, the polarization plates 4 and 5 of the liquid crystal display cell 16 are provided so that respective absorption axes $AX_1$ and $AX_2$ of the polarization plates 4 and 5 are parallel to the respective rubbing directions $R_1$ and $R_2$ of the alignment layers 11 and 14 (see FIG. 1), respectively. Also, in the present liquid crystal display device, since the rubbing directions $R_1$ and $R_2$ are orthogonal to each other, the absorption axes $AX_1$ and $AX_2$ are also orthogonal to each other accordingly.

Here, as shown in FIG. 3, the direction formed by projecting the principal refractive index $n_b$, which is inclined in a direction to give anisotropy to the phase difference plates 2 and 3, on the surface of the phase difference plate 2 or 3 is defined as the direction D. As shown in FIG. 4, the phase difference plate 2 is positioned so that the direction D (direction $D_1$) is parallel to the rubbing direction $R_1$, and the phase difference plate 3 is positioned so that the direction D (direction $D_2$) is parallel to the rubbing direction $R_2$.

With the above-mentioned arrangement of the phase difference plates 2 and 3 and the polarization plates 4 and 5, the present liquid crystal display device carries out light displaying and dark displaying when a voltage is not applied and a voltage is applied, respectively. Namely, a so-called normally white displaying is carried out in which white displaying is carried out by allowing light to transmit during the off-state.

Generally, in an optically anisotropic material such as liquid crystal and a phase difference plate (phase difference film), the anisotropy of three dimensional principal refractive indices of $n_a$, $n_b$, and $n_c$ is represented by a refractive index ellipsoid. The value of the refractive index anisotropy Δn differs depending on the direction in which the refractive index ellipsoid is observed.

The following will describe the liquid crystal layer 8 in detail.

As mentioned above, in order to obtain the most desirable property out of the combination of the liquid crystal layer 8 and the compensation function of the phase difference by the phase compensation plates 2 and 3, as a liquid crystal material of the liquid crystal layer 8, such a liquid crystal material is adopted in which the refractive index anisotropy Δn satisfies a predetermined condition, namely, the refractive index anisotropy Δn of the liquid crystal layer 8 is set in such a range that the change in the refractive index anisotropy Δn with a wavelength of light does not cause viewing-angle-dependent coloration on the liquid crystal screen.

Specifically, a liquid crystal material which is designed to satisfy at least one of the specified ranges in the following ① to ③ conditions is adopted.

① The difference (Δn(450)−Δn(650)) of the liquid crystal material, between (a) the refractive index anisotropy Δn(450) for the light having a wavelength of 450 nm and (b) the refractive index anisotropy Δn(650) for the light having a wavelength of 650 nm, is set in a range of not less than 0 and less than 0.010. More preferably, the difference (Δn (450)−Δn(650)) is set in a range of not less than 0 and not more than 0.0055.

② The ratio (Δn(450)/Δn(550)) of the liquid crystal material, which is the ratio of (a) the refractive index anisotropy Δn(450) for the light having a wavelength of 450 nm to (b) the refractive index anisotropy Δn(550) for the light having a wavelength of 550 nm, is set in a range of not less than 1 and less than 1.07. More preferably, the ratio (Δn(450)/Δn(550)) is set in a range of not less than 1 and not more than 1.05.

③ The ratio (Δn(650)/Δn(550)) of the liquid crystal material, which is the ratio of (a) the refractive index anisotropy Δn(650) for the light having a wavelength of 650 nm to (b) the refractive index anisotropy Δn(550) for the light having a wavelength of 550 nm, is set in a range of more than 0.960 and not more than 1. More preferably, the ratio (Δn(650)/Δn(550)) is set in a range of not less than 0.975 and not more than 1.

By adopting a liquid crystal display material satisfying at least one of the above ① to ③ conditions, it is possible, due to the compensation function of the phase difference by the phase difference plates 2 and 3, to suppress the change in contrast and the reversion phenomenon caused by the viewing-angle dependency of the display screen. Particularly, the coloration phenomenon of the display screen can be effectively improved.

To describe in more detail, by adopting a liquid crystal display material satisfying the wider range of at least one of the above ① to ③ conditions, it is possible to provide a liquid crystal display device in which a satisfactory image can be observed (although slight coloration is observed) in any viewing direction in a viewing angle of 50° which is a required viewing angle in most liquid crystal display devices.

Further, by adopting a liquid crystal display material satisfying at least one of the ranges which are stated to be more preferable in the above ① to ③ conditions, it is possible to provide a liquid crystal display device in which an image without any coloration can be observed in any viewing direction in a viewing angle of 70°.

Also, by adopting a liquid crystal display material satisfying at least one of the above ① to ③ conditions, compared with the case of relying solely on the compensation function of the phase compensation plates 2 and 3, it is possible to further suppress the change in contrast and the reversion phenomenon.

It is further preferable that in addition to satisfying at least one of the specified ranges of the above ① to ③ conditions, the specified range of the following condition ④ is also satisfied. In the liquid crystal layer 8 of the present liquid crystal display device, the specified range of the condition ④ is satisfied.

④ The refractive index anisotropy Δn(550) of the liquid crystal material for the light having a wavelength of 550 nm is set in a range of more than 0.060 and less than 0.120. More preferably, the refractive index anisotropy Δn(550) of the liquid crystal material for the light having a wavelength of 550 nm is set in a range of not less than 0.070 and not more than 0.095.

By satisfying the condition ④, in addition to (a) the phase compensation function of the phase difference by the phase compensation plates 2 and 3 and (b) the improvement of the viewing-angle-dependency made by the compensation function obtained by satisfying at least one of the above ① to ③ conditions, it is possible to further suppress lowering of the contrast ratio in the opposite viewing direction and the reversion phenomenon in the left and right directions.

Figure 5:
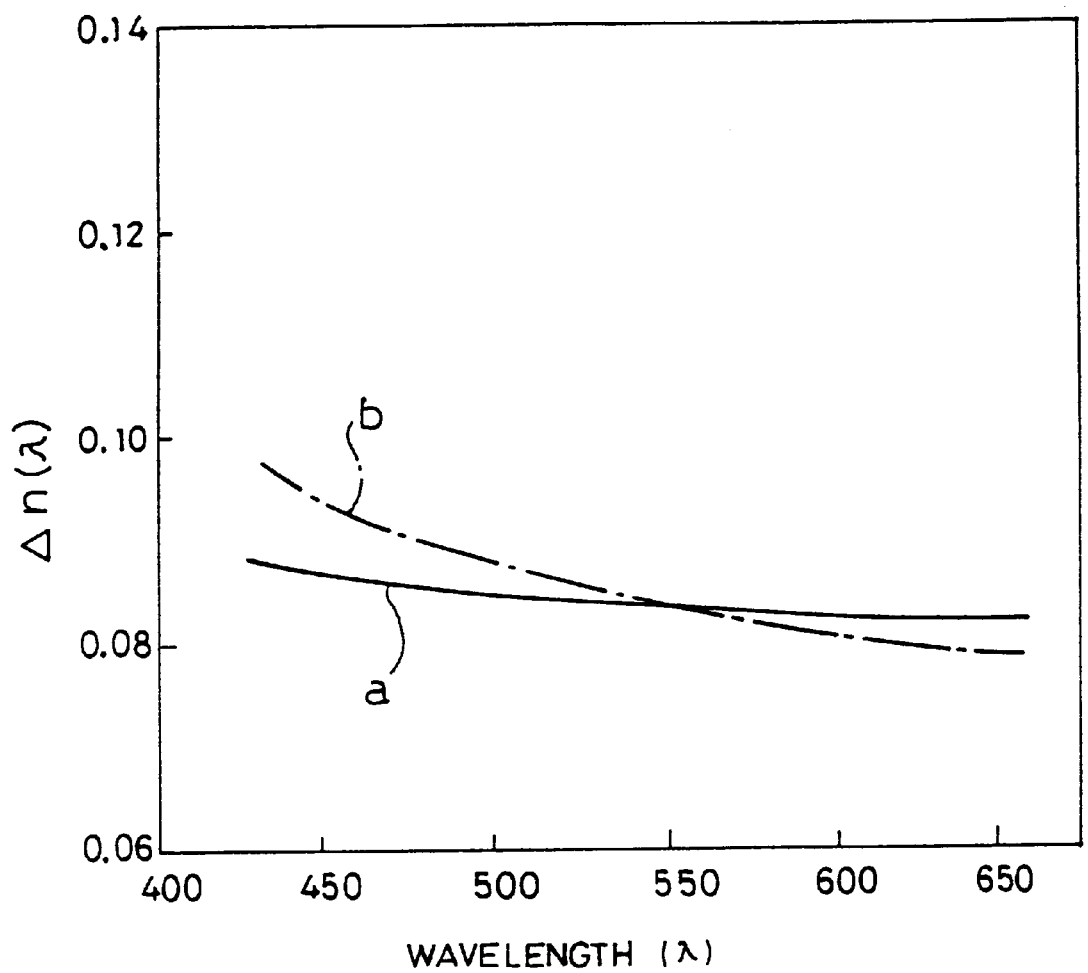
FIG. 5 is a graph of refractive index anisotropy $\Delta n$ versus wavelength of a liquid crystal material adopted as a liquid crystal layer of the liquid crystal display device.

FIG. 5 shows a graph of wavelength (λ) against Δn (λ), wherein a wavelength-refractive index anisotropy Δn characteristic of a liquid crystal material which can be adopted as the liquid crystal layer 8 of the present liquid crystal display device is represented by the solid curve "a". Note that, in FIG. 5, for comparison, a wavelength-refractive index anisotropy Δn characteristic of a liquid crystal display material adopted as the liquid crystal layer of a conventional liquid crystal display device is represented by the alternate long and short dash curve "b".

As is clear from the comparison of the curve "a" and the curve "b", compared with that of the liquid crystal material adopted in a conventional liquid crystal display device, the wavelength-refractive index anisotropy Δn characteristic of the liquid crystal material which can be adopted as the liquid crystal layer 8 of the present liquid crystal display device shows a more gradual and substantially horizontal slope slightly declining down to the right.

Figure 6:
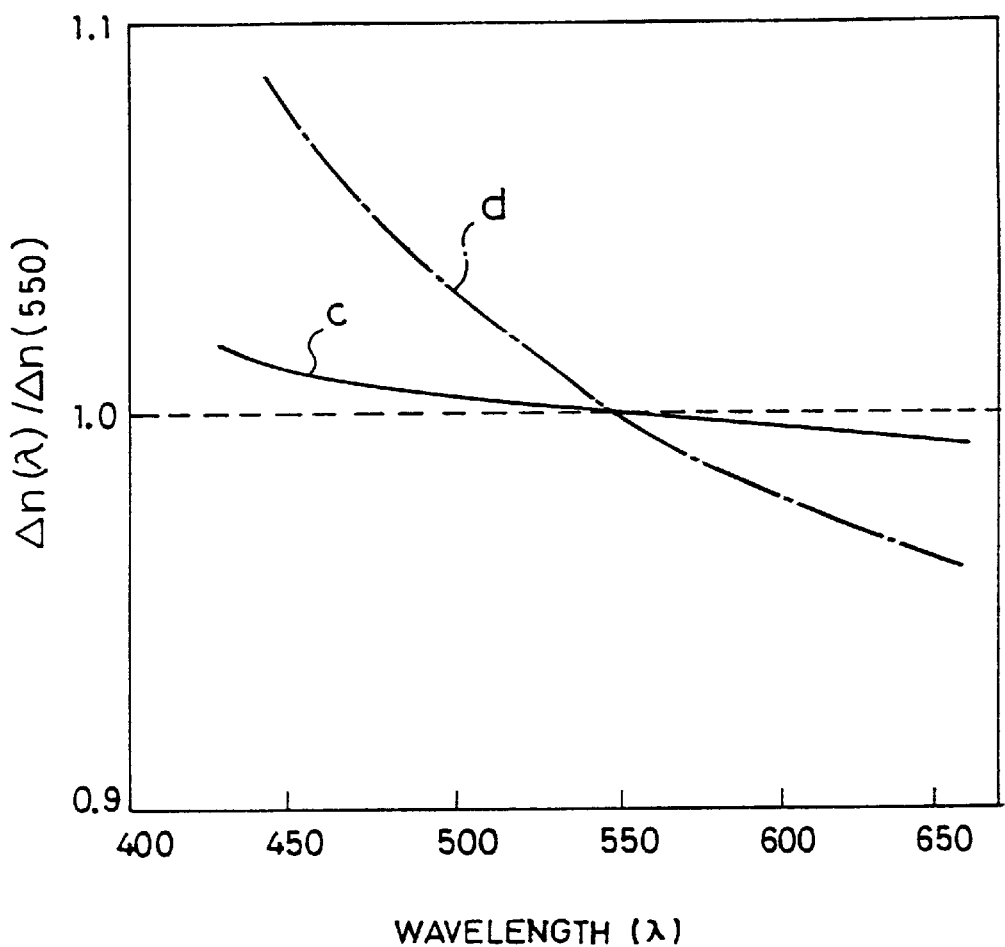
FIG. 6 is a graph of $\Delta n(\lambda)/\Delta n(550)$ versus wavelength of another liquid crystal material adopted as a liquid crystal layer of the liquid crystal display device.

Similarly, FIG. 6 shows a graph of Δn(λ)/Δn(550) against wavelength (λ), wherein a wavelength-refractive index anisotropy Δn characteristic of another liquid crystal material which can be adopted in the present liquid crystal display device is represented by the solid curve "c". Note that, in FIG. 6, for comparison, a wavelength-refractive index anisotropy Δn characteristic of another liquid crystal material adopted as the liquid crystal layer of a conventional liquid crystal display device is represented by the alternate long and short dash curve "d".

As is clear from the comparison of the curve "c" and the curve "d", compared with that of the liquid crystal material adopted in a conventional liquid crystal display device, the wavelength-refractive index anisotropy Δn characteristic of the liquid crystal material which can be adopted as the liquid crystal layer 8 of the present liquid crystal display device shows a slope which is more gradual than that of the liquid crystal material adopted in a conventional liquid crystal display device.

With the described arrangements, in the liquid crystal display device of the present embodiment, in addition to the function by the phase difference plates 2 and 3 for compensating the phase difference generated in the liquid crystal display element 1 in accordance with viewing angles, by setting the change in refractive index anisotropy Δn with a wavelength in the liquid crystal material of the liquid crystal layer 8 in such a range that no coloration of the liquid crystal screen is generated, a function for compensating the phase difference is provided. Thus, it is possible to effectively improve, in particular, the viewing-angle-dependant coloration of the liquid crystal screen, and at the same time, the change in contrast and the reversion phenomenon are also improved, thereby realizing high quality image displaying.

The following will describe, together with comparative examples, examples in accordance with the liquid crystal display device of the present embodiment having the described arrangement.

FIRST EXAMPLE

In the present example, as the liquid crystal layer 8 of the liquid crystal cell 16 provided in the liquid crystal display device of FIG. 1, five samples #1 to #5, each having a cell thickness (thickness of the liquid crystal layer 8) of 5 μm, were prepared by adopting such liquid crystal materials in which the difference $\Delta n(450)-\Delta n(650)$ between the refractive index anisotropy $\Delta n(450)$ for the wavelength of 450 nm and the refractive index anisotropy $\Delta n(650)$ for the wavelength of 650 nm is set to 0, 0.0030, 0.0055, 0.0070, and 0.0090 for the samples #1 to #5, respectively.

The phase difference plates 2 and 3 adopted in the samples #1 to #5 satisfy the following conditions: (1) the discotic liquid crystal is applied to a transparent support base (for example, triacetylcellulose (TAC), etc.), (2) the discotic liquid crystal is tilt-aligned on the support base, and is crosslinked to each other, (3) the first retardation value and the second retardation value are respectively set to 0 nm and 100 nm, and (4) the principal refractive index $n_b$ is inclined by an angle of substantially 200 in a direction of the arrow A with respect to the z-axis of the x-y-z coordinates in the x-z plane, and in the same manner, the principal refractive index $n_c$ is inclined by an angle of substantially 200 in a direction of the arrow B with respect to the x-axis (in other words, the tilt-angle θ of the refractive index ellipsoid is 20°.

Also, as a comparative example of the present example, a comparative sample #100 was prepared. The comparative sample #100 has an arrangement the same as that of the samples #1 to #5 except that in the sample #100, such a liquid crystal material is adopted as the liquid crystal layer 8 of the liquid crystal cell 16 provided in the liquid crystal display device of FIG. 1, in which the difference $\Delta n(450)-\Delta n(650)$ is set to 0.010.

Table 1 shows results of visual inspections under the white light using the samples #1 to #5 and the comparative sample #100.

TABLE 1

| viewing | $\Delta n(450) - \Delta n(650)$ | | | | $(\times 10^{-3})$ | |
|---|---|---|---|---|---|---|
| angle (θ) | 0 #1 | 3.0 #2 | 5.5 #3 | 7.0 #4 | 9.0 #5 | 10 #100 |
| 50° | ○ | ○ | ○ | ○ | Δ | X |
| 60° | ○ | ○ | ○ | ○ | X | X |
| 70° | ○ | ○ | ○ | X | X | X |

In Table 1, ○ indicates "no coloration", Δ indicates "coloration present, but tolerable in actual use", and X indicates "coloration present which is not tolerable in actual use".

In the samples #1 to #3, a desirable image was obtained without any coloration in any viewing direction in the viewing angle of 70°. In the sample #4, a desirable image was obtained without any coloration in any viewing direction up until the viewing angle of 60°. In the sample #5, slight coloration was observed in the left and right viewing directions in the viewing angle of 50°, but the coloration was not serious enough to cause a problem in an actual use.

In contrast, in the comparative sample #100, in the viewing angle of 50°, in the left and right viewing directions, yellow to orange coloration was observed which is not tolerable in an actual use.

In the present example, the phase difference plates 2 and 3 having an arrangement wherein the discotic liquid crystal is tilt-aligned on the transparent support base are adopted. However, by adopting the phase difference plates 2 and 3 having an arrangement wherein the discotic liquid crystal is hybrid-aligned rather than tilt-aligned, the results same as that obtained in the samples #1 to #5 and the comparative sample #100 were obtained as well.

SECOND EXAMPLE 2

In the present example, as the liquid crystal layer 8 of the liquid crystal cell 16 provided in the liquid crystal display device of FIG. 1, five samples #6 to #10, each having a cell thickness (thickness of the liquid crystal layer 8) of 5 μm, were prepared by adopting such liquid crystal materials in which the ratio $\Delta n(450)/\Delta n(550)$, which is the ratio of the refractive index anisotropy $\Delta n(450)$ for the wavelength of 450 nm to the refractive index anisotropy $\Delta n(550)$ for the wavelength of 550 nm, is set to 1, 1.03, 1.05, 1.06, and 1.065 for the samples #6 to #10, respectively.

As the phase difference plates 2 and 3 adopted in the samples #6 to #10, the phase difference plates 2 and 3 of the first example in which the discotic liquid crystal is tilt-aligned are adopted.

Also, as a comparative example of the present example, a comparative sample #101 was prepared. The comparative sample #101 has an arrangement the same as that of the samples #6 to #10 except that in the comparative sample #101, such a liquid crystal material is adopted as the liquid crystal layer 8 of the liquid crystal cell 16 provided in the liquid crystal display device of FIG. 1, in which the ratio $\Delta n(450)/\Delta n(550)$ is set to 1.07.

Table 2 shows results of visual inspections under the white light using the samples #6 to #10 and the comparative sample #101.

TABLE 2

| viewing | $\Delta n(450)/\Delta n(550)$ | | | | $(\times 10^{-3})$ | |
|---|---|---|---|---|---|---|
| angle (θ) | 1 #6 | 1.03 #7 | 1.05 #8 | 1.06 #9 | 1.065 #10 | 1.07 #101 |
| 50° | ○ | ○ | ○ | ○ | Δ | X |
| 60° | ○ | ○ | ○ | Δ | X | X |
| 70° | ○ | ○ | ○ | X | X | X |

In Table 2, ○ indicates "no coloration", Δ indicates "coloration present, but tolerable in actual use", and X indicates "coloration present which is not tolerable in actual use".

In the samples #6 to #8, a desirable image was obtained without any coloration in any viewing direction in the viewing angle of 70°. In the sample #9, a desirable image was obtained without any coloration in any viewing direction up until the viewing angle of 50°. However, in the sample #9, slight coloration was observed in the left and right viewing directions in the viewing angle of 60°, but the coloration was not serious enough to cause a problem in an actual use. In the sample #10, slight coloration was also observed in the left and right viewing directions in the viewing angle of 50°, but the coloration was not serious enough to cause a problem in an actual use.

In contrast, in the comparative sample #101, in the viewing angle of 50°, in the left and right viewing directions, yellow to orange coloration was observed which is not tolerable in an actual use.

In the present example, the phase difference plates 2 and 3 having an arrangement wherein the discotic liquid crystal is tilt-aligned on the transparent support base are adopted. However, by adopting the phase difference plates 2 and 3 having an arrangement wherein the discotic liquid crystal is hybrid-aligned rather than tilt-aligned, the results same as that obtained in the samples #6 to #10 and the comparative sample #101 were obtained as well.

SECOND EXAMPLE 3

In the present example, as the liquid crystal layer 8 of the liquid crystal cell 16 provided in the liquid crystal display device of FIG. 1, five samples #11 to #15, each having a cell thickness (thickness of the liquid crystal layer 8) of 5 μm, were prepared by adopting such liquid crystal materials in which the ratio Δn(650)/Δn(550), which is the ratio of the refractive index anisotropy Δn(650) for the wavelength of 650 nm to the refractive index anisotropy Δn(550) for the wavelength of 550 nm, is set to 1, 0.980, 0.975, 0.970, and 0.965 for the samples #11 to #15, respectively.

As the phase difference plates 2 and 3 respectively adopted in the samples #11 to #15, the phase difference plates 2 and 3 of the first example in which the discotic liquid crystal is tilt-aligned are adopted.

Also, as a comparative example of the present example, a comparative sample #102 was prepared. The comparative sample #102 has an arrangement the same as that of the samples #11 to #15 except that in the comparative sample #102, such a liquid crystal material is adopted as the liquid crystal layer 8 of the liquid crystal cell 16 provided in the liquid crystal display device of FIG. 1, in which the ratio Δn(650)/Δn (550) is set to 0.960.

Table 3 shows results of visual inspections under the white light using the samples #11 to #15 and the comparative sample #102.

TABLE 3

| viewing angle (θ) | Δn (650)/Δn (550) (x10⁻³) | | | | | |
|---|---|---|---|---|---|---|
| | 1 #11 | 0.980 #12 | 0.975 #13 | 0.970 #14 | 0.965 #15 | 0.960 #102 |
| 50° | ○ | ○ | ○ | ○ | Δ | X |
| 60° | ○ | ○ | ○ | Δ | X | X |
| 70° | ○ | ○ | ○ | X | X | X |

In Table 3, ○ indicates "no coloration", Δ indicates "coloration present, but tolerable in actual use", and X indicates "coloration present which is not tolerable in actual use".

In the samples #11 to #13, a desirable image was obtained without any coloration in any viewing direction in the viewing angle of 70°. In the sample #14, a desirable image was obtained without any coloration in any viewing direction up until the viewing angle of 50°. However, in the sample #14, slight coloration was observed in the left and right viewing directions in the viewing angle of 60°, but the coloration was not serious enough to cause a problem in an actual use. In the sample #15, slight coloration was also observed in the left and right viewing directions in the viewing angle of 50°, but the coloration was not serious enough to cause a problem in an actual use.

In contrast, in the comparative sample #102, in the viewing angle of 50°, in the left and right viewing directions, yellow to orange coloration was observed which is not tolerable in an actual use.

In the present example, the phase difference plates 2 and 3 having an arrangement wherein the discotic liquid crystal is tilt-aligned on the transparent support base are adopted. However, by adopting the phase difference plates 2 and 3 having an arrangement wherein the discotic liquid crystal is hybrid-aligned rather than tilt-aligned, the results same as that obtained in the samples #11 to #15 and the comparative sample #102 were obtained as well.

FOURTH EXAMPLE

In the present example, as shown in FIG. 7, the viewing-angle-dependency of the liquid crystal display device was measured by using a measuring system provided with a light-receiving element 21, an amplifier 22, and a recording device 23. The liquid crystal cell 16 is positioned so that a surface 16*a* on the side of the glass substrate 9 represents a reference plane x-y of the rectangular coordinates x-y-z. The light-receiving element 21 receives light with a certain stereoscopic light-receiving angle, and is positioned with a predetermined distance away from the coordinate origin in a direction making an angle Φ (viewing angle) with respect to the z-direction perpendicular to the surface 16*a*.

During a measuring process, monochromatic light having a wavelength of 550 nm is projected on the liquid crystal cell 16, which has been set in the present measuring system, through the surface opposite to the surface 16*a*. The monochromatic light having passed through the liquid crystal cell 16 is partially made incident on the light-receiving element 21. The output of the light-receiving element 21, after amplified to a predetermined level by the amplifier 22, is recorded by the recording device 23 such as a waveform memory or a recorder.

In the present example, as the liquid crystal layer 8 of the liquid crystal cell 16 provided in the liquid crystal display device of FIG. 1, three samples #16 to #18, each having a cell thickness (thickness of the liquid crystal layer 8) of 5 μm, were prepared by adopting such liquid crystal materials whose refractive index anisotropy Δn(550) for the wavelength of 550 nm are 0.070, 0.080, and 0.095 for the samples #16 to #18, respectively.

As the phase difference plates 2 and 3 respectively adopted in the samples #16 to #18, the phase difference plates 2 and 3 of the first example in which the discotic liquid crystal is tilt-aligned are adopted.

The measurement was conducted using the samples #16 to #18 set in the measuring system of FIG. 7, and the light-receiving element 21 fixed to a position with a certain angle Φ. In the measurement, the output level of the light-receiving element 21 against an applied voltage to the samples #16 to #18 was measured.

In the measurement, the light-receiving element 21 was positioned with an angle Φ of 50°, and supposing that the y-direction and the x-direction respectively direct to the left side and the bottom side of the screen, the position of the light-receiving element 21 was changed so as to carry out the measurement from the upward direction (opposite viewing direction), the left direction, and the right direction.

Figure 8A:
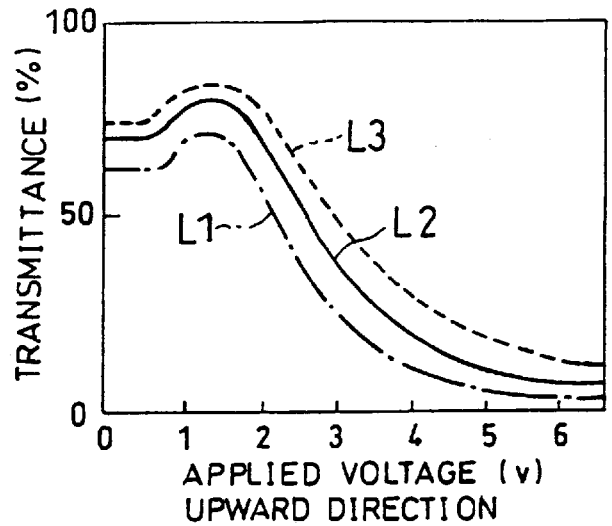
FIG. 8($a$) through FIG. 8($c$) are graphs respectively showing transmittance vs. applied voltage of the liquid crystal display device of a first example.
Figure 8B:
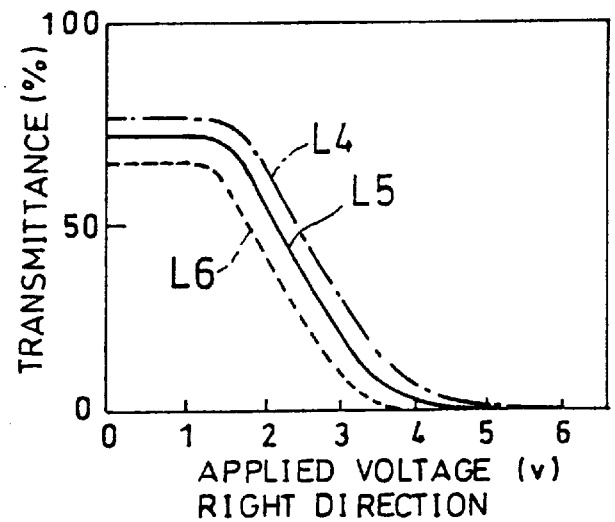
Figure 8C:
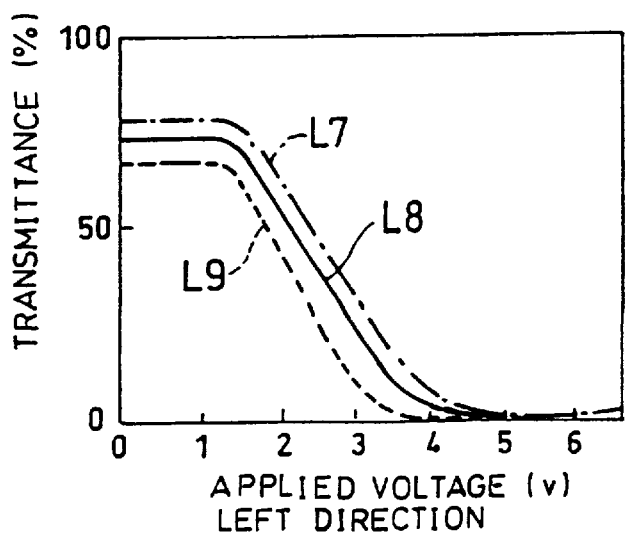

The results of the measurement are shown in FIG. 8(*a*) through FIG. 8(*c*). FIG. 8(*a*) through FIG. 8(*c*) are graphs respectively showing transmittance of light against a voltage applied to the samples #16 to #18 (transmittance vs. applied voltage).

FIG. 8(*a*), FIG. 8(*b*), and FIG. 8(*c*) respectively show the results when the measurement was carried out from the upward direction, the right direction, and the left direction respectively indicated in FIG. 2.

In FIG. 8(*a*) through FIG. 8(*c*), the curves L1, L4, and L7 indicated by the alternate long and short lines represent the sample #16 adopting, as the liquid crystal layer 8, a liquid crystal material having the refractive index anisotropy Δn(550) of 0.070. The curves L2, L5, and L8 indicated by the solid lines represent the sample #17 adopting, as the liquid crystal layer 8, a liquid crystal material having the refractive index anisotropy Δn(550) of 0.080. The curves L3, L6, and L9 indicated by the dotted lines represent the sample #18 adopting, as the liquid crystal layer 8, a liquid crystal material having the refractive index anisotropy Δn(550) of 0.095.

Also, as a comparative example of the present example, two samples #103 and #104 were prepared. The comparative samples #103 and #104 have an arrangement the same as that of the samples #16 to #18 except that in the comparative samples #103 and #104, such liquid crystal materials are adopted as the liquid crystal layer 8 of the liquid crystal cell 16 provided in the liquid crystal display device of FIG. 1, whose refractive index anisotropy Δn(550) for the wavelength of 550 nm are set to 0.060 and 0.120 for the comparative samples #103 and #104, respectively. The comparative samples #103 and #104 thus prepared were set in the measuring system of FIG. 7, and the light-receiving element 21 was fixed to a position with a certain angle Φ in the same manner as the present example so as to measure the output level of the light-receiving element 21 against a voltage applied to the comparative samples #103 and #104.

In the measurement, as in the present example, the light-receiving element 21 was positioned with an angle Φ of 50°, and supposing that the y-direction and the x-direction respectively direct to the left side and the bottom side of the screen, the position of the light-receiving element 21 was changed so as to carry out the measurement from the upward direction, the left direction, and the right direction.

Figure 9A:
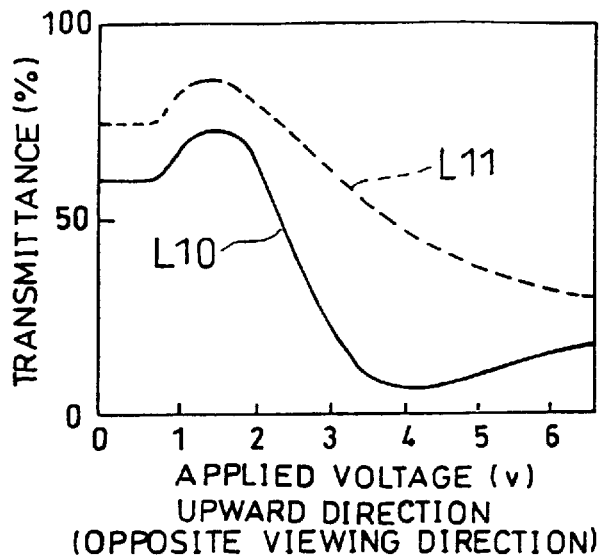
FIG. 9($a$) through FIG. 9($c$) are graphs respectively showing transmittance vs. applied voltage of the liquid crystal display device of a comparative example of the first example.
Figure 9B:
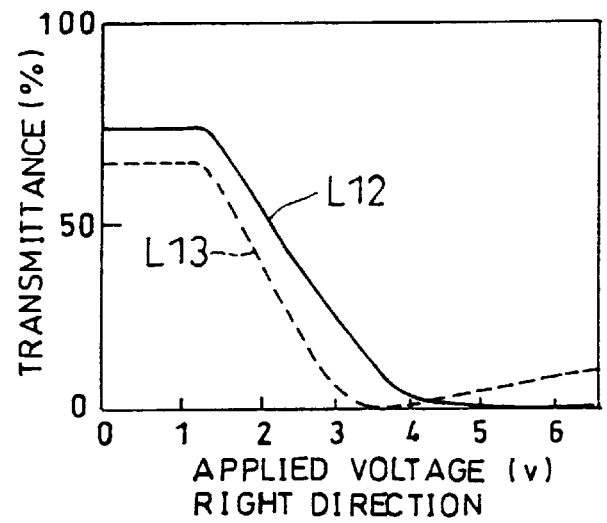
Figure 9C:
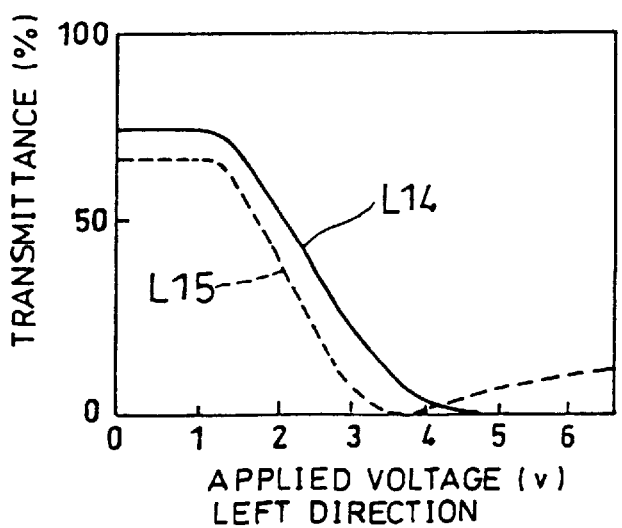
Figure 10:
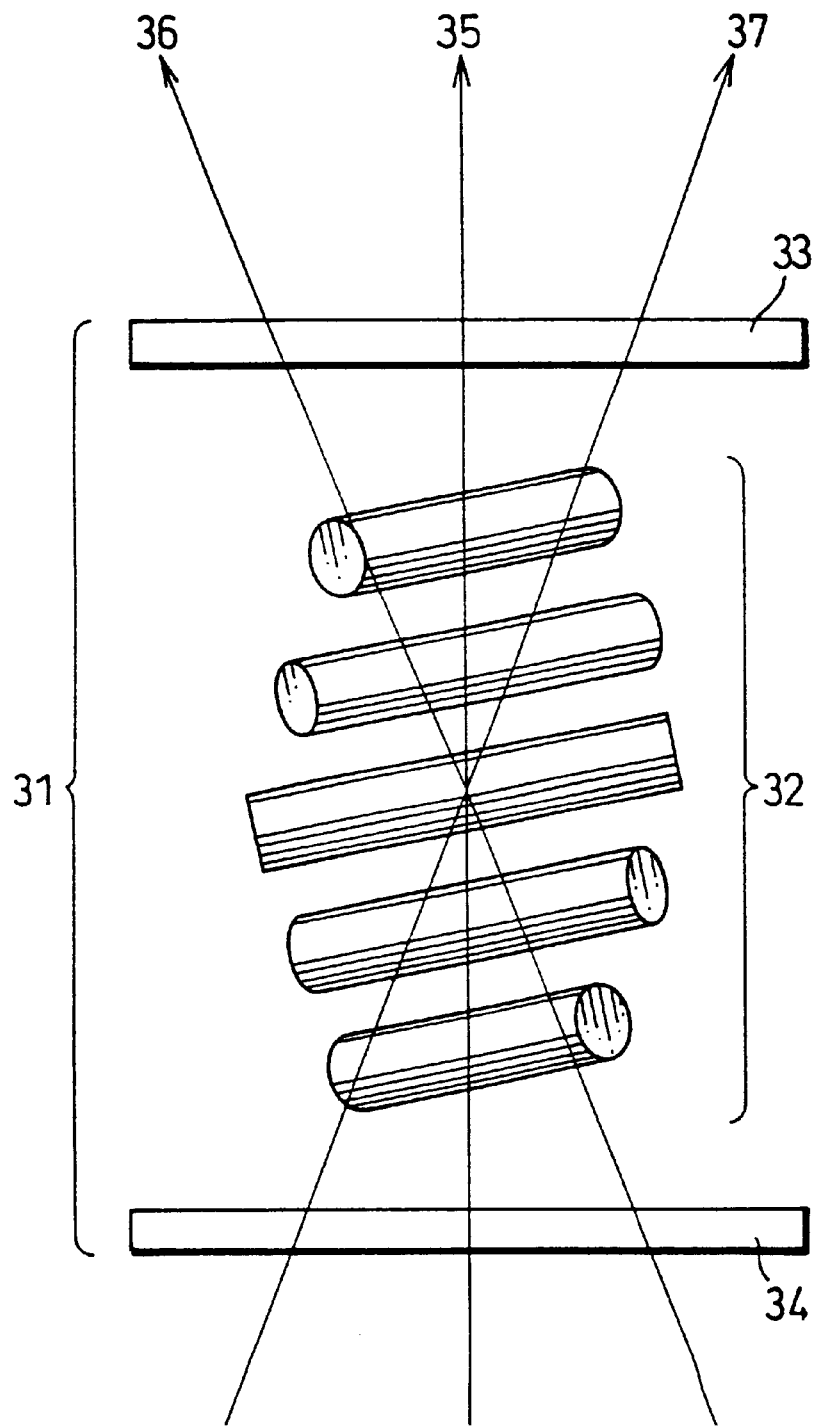
FIG. 10 is a schematic diagram showing twisted alignment of liquid crystal molecules of a TN liquid crystal display element.

The results of the measurement are shown in FIG. 9(*a*) through FIG. 9(*c*). FIG. 9(*a*) through FIG. 9(*c*) are graphs respectively showing transmittance of light against a voltage applied to the comparative samples #103 and #104 (transmittance vs. applied voltage).

FIG. 9(*a*), FIG. 9(*b*), and FIG. 9(*c*) respectively show the results when the measurement was carried out from the upward direction, the right direction, and the left direction respectively indicated in FIG. 2.

In FIG. 9(*a*) through FIG. 9(*c*), the curves L10, L12, and L14 indicated by the solid lines represent the comparative sample #103 adopting, as the liquid crystal layer 8, a liquid crystal material having the refractive index anisotropy Δn(550) of 0.060, and the curves L11, L13, and L15 indicated by the dotted lines represent the comparative sample #104 adopting, as the liquid crystal layer 8, a liquid crystal material having the refractive index anisotropy Δn(550) of 0.120.

When the samples #16 to #18 of the present example and the comparative samples #103 and #104 of the comparative example were compared with respect to transmittance versus applied voltage in the upward direction, it was found that in FIG. 8(*a*), the transmittance, as indicated by the curves L1, L2, and L3, decreased by a sufficient amount as the applied voltage was increased. In contrast, in FIG. 9(*a*), compared with the curves L1, L2, and L3 of FIG. 8(*a*), the transmittance, as indicated by the curve L11, did not decrease by a sufficient amount even though an applied voltage was increased. On the other hand, the curve L10 exhibited the reversion phenomenon in which the transmittance decreased after an initial drop as the applied voltage was increased.

In the same manner, when the samples #16 to #18 of the present example and the comparative samples #103 and #104 of the comparative example were compared with respect to transmittance versus applied voltage in the right direction, it was found that in FIG. 8(*b*), the transmittance, as indicated by the curves L4, L5, and L6, decreased to substantially 0 as the applied voltage was increased. Also, in FIG. 9(*b*), as in FIG. 8(*b*), the transmittance, as indicated by the curve L12, decreased to substantially 0 with an increased applied voltage. However, the curve 13 exhibited the reversion phenomenon.

Also, when the samples #16 to #18 of the present example and the comparative samples #103 and #104 of the comparative example were compared with respect to transmittance versus applied voltage in the left direction, as in the right direction, while the transmittance, as indicated by the curves L7, L8, and L9 of FIG. 8(*c*), and the transmittance, as indicated by the curve L14 of FIG. 9(*c*), all decreased to substantially 0 with an increased applied voltage, only the curve L15 of FIG. 9(*c*) exhibited the reversion phenomenon.

Further, visual inspections were carried out using the samples #16 to #18 and the comparative samples #103 and #104 under the white light. The results are as follows.

A desirable image with no coloration was obtained in the samples #16 to #18 and the comparative sample #103 when observed from any direction in a viewing angle of 50°. In contrast, yellow to orange coloration was observed in the comparative sample #104 when observed from the left and right directions in a viewing angle of 50°.

It can be seen from the results of the measurements that, as shown in FIG. 8(*a*) through FIG. 8(*c*), when such liquid crystal materials are adopted as the liquid crystal layer 8, whose refractive index anisotropy Δn(550) for the wavelength of 550 nm are respectively set to 0.070, 0.080, and 0.095, the transmittance thereof are decreased by a sufficient amount without no reversion phenomenon. This makes the viewing angle wider without inducing the coloration phenomenon, thereby greatly improving the displaying quality of the liquid crystal display device.

In contrast, as shown in FIG. 9(*a*) through FIG. 9(*c*), when such liquid crystal materials are adopted as the liquid crystal layer 8, whose refractive index anisotropy Δn(550) for the wavelength of 550 nm are respectively set to 0.060 and 0.120, the viewing-angle-dependency is not improved satisfactorily.

In the present example, the phase difference plates 2 and 3 having an arrangement wherein the discotic liquid crystal is tilt-aligned on the transparent support base are adopted. However, by adopting the phase difference plates 2 and 3 having an arrangement wherein the discotic liquid crystal is hybrid-aligned rather than tilt-aligned, the results same as that obtained in the samples #16 to #18 and the comparative samples #103 and #104 were obtained as well.

Further, when the dependency of a transmittance-applied voltage characteristic on the tilt-angle θ was examined by changing the tilt-angle θ of the refractive index ellipsoid of the phase difference plates 2 and 3, it was found that as long as the tilt-angle θ is in a range of $15°\leq\theta\leq75°$, no change was observed regardless of the alignment state of the discotic liquid crystal of the phase difference plates 2 and 3. Note that, in the case where the tilt-angle θ exceeds the range of $150°\leq\theta\leq75°$, it was found that the viewing angle does not widen in the opposite viewing direction.

Also, when the dependency of a transmittance-applied voltage characteristic on the second retardation value was examined by changing the second retardation value of the phase difference plated 2 and 3, it was found that as long as the second retardation value falls in a range of 80 nm to 250 nm, no change was observed regardless of the alignment state of the discotic liquid crystal. Note that, in the case where the second retardation value exceeds the range of 80 nm to 250 nm, it was found that the viewing angle does not widen in the lateral direction (left and right directions).

In order to further examine in more detail the results of the visual inspections obtained by using the samples #16 to #18 and the comparative samples #103 and #104, three samples #19 to #21 were prepared. The samples #19 to #21 have an arrangement the same as that of the samples adopted in the present example except that in the samples #19 to #21, such liquid crystal materials are adopted as the liquid crystal layer 8 of the liquid crystal cell 16 provided in the liquid crystal display device of FIG. 1, whose refractive index anisotropy $\Delta n(550)$ for the wavelength of 550 nm are set to 0.065, 0.100, and 0.115 for the samples #19 to #21, respectively. The samples #19 to #21 thus prepared were set in the measuring system of FIG. 7, and the light-receiving element 21 was fixed to a position with a certain angle $\Phi$ in the same manner as above so as to measure the output level of the light-receiving element 21 in response to a voltage applied to the samples #19 to #21. The visual inspections were carried out under the white light.

The results showed that in the samples #20 and #21 whose refractive index anisotropy $\Delta n(550)$ are respectively 0.100 and 0.115, when the angle $\Phi$ is 50°, a slight increase in the transmittance was observed in response to an increase in the voltage in the left and right directions. However, no reversion phenomenon was observed in the inspection such that the slight increase in the transmittance observed here is tolerable in an actual use. Also, in the samples #20 and #21, no problem was presented in the upward direction. In contrast, in the sample #19 whose refractive index anisotropy $\Delta n(550)$ is 0.065, as in the comparative sample #103, the transmittance exhibited a curve which rises after an initial drop. However, compared with that of the comparative example #103 of FIG. 9(a), the rise in the transmittance is smaller, and therefore is tolerable in an actual use. Also, in the sample #19, no problem was presented in the left and right directions.

In the visual inspections, in the samples #20 and #21, slight yellow to orange coloration was observed, but only to the extent which does not pose a problem. Similarly, in the sample #19, slight blue coloration was observed, but only to the extent which does not pose a problem.

In addition to the measurements described above, the transmittance in a direction normal to the surface of the liquid crystal cell 16 during white displaying was measured by applying a voltage of substantially 1V using the sample #19 and the comparative sample #103. The results are as follows: in the comparative sample #103, a decrease in transmittance was observed which is not tolerable in an actual use, whereas in the sample #19, a slight decrease in transmittance was observed, but only to the extent which is tolerable in an actual use.

As described, in the embodiment of the present invention, in the case of adopting a phase difference plate whose three principal refractive indices $n_a$, $n_b$, and $n_c$ are related to each other by the relation $n_a = n_c > n_b$, and in which the principal refractive index $n_b$ is inclined with respect to a direction normal to the surface of the phase difference plate, when a change in the refractive index anisotropy $\Delta n$ with a wavelength of light is in at least one of the ranges specified in the following first through third conditions, it is possible to suppress the generation of viewing-angle-dependant coloration on the liquid crystal screen.

The first condition: The difference $\Delta n(450) - \Delta n(650)$ of the liquid crystal material of the liquid crystal layer, between the refractive index anisotropy $\Delta n(450)$ for the light having a wavelength of 450 nm and the refractive index anisotropy $\Delta n(650)$ for the light having a wavelength of 650 nm is set in a range of not less than 0 and less than 0.010.

The second condition: The ratio $\Delta n(450)/\Delta n(550)$ of the liquid crystal material of the liquid crystal layer, which the ratio of (a) the refractive index anisotropy $\Delta n(450)$ for the light having a wavelength of 450 nm to (b) the refractive index anisotropy $\Delta n(550)$ for the light having a wavelength of 550 nm, is set in a range of not less than 1 and less than 1.07.

The third condition: The ratio $\Delta n(650)/\Delta n(550)$ of the liquid crystal material of the liquid crystal layer, which the ratio of (a) the refractive index anisotropy $\Delta n(650)$ for the light having a wavelength of 650 nm to (b) the refractive index anisotropy $\Delta n(550)$ for the light having a wavelength of 550 nm, is set in a range of more than 0.96 and not more than 1.

By satisfying at least one of the above first through third conditions, it is possible, although some coloration is observed, to provide an image which is tolerable in an actual use in any direction in a viewing angle of 50° which is a required viewing angle in a common liquid crystal display device.

In a liquid crystal display device requiring a wider viewing angle, for example, a viewing angle of 70°, it is preferable that a change in the refractive index anisotropy $\Delta n$ with a wavelength of light is in at least one of the ranges specified in the following fourth through sixth conditions.

The fourth condition: The difference $\Delta n(450) \Delta n(650)$ of the liquid crystal material of the liquid crystal layer, between the refractive index anisotropy $\Delta n(450)$ for the light having a wavelength of 450 nm and the refractive index anisotropy $\Delta n(650)$ for the light having a wavelength of 650 nm is set in a range of not less than 0 and not more than 0.0055.

The fifth condition: The ratio $\Delta n(450)/\Delta n(550)$ of the liquid crystal material of the liquid crystal layer, which the ratio of (a) the refractive index anisotropy $\Delta n(450)$ for the light having a wavelength of 450 nm to (b) the refractive index anisotropy $\Delta n(550)$ for the light having a wavelength of 550 nm, is set in a range of not less than 1 and not more than 1.05.

The sixth condition: The ratio $\Delta n(650)/\Delta n(550)$ of the liquid crystal material of the liquid crystal layer, which the ratio of (a) the refractive index anisotropy $\Delta n(650)$ for the light having a wavelength of 650 nm to (b) the refractive index anisotropy $\Delta n(550)$ for the light having a wavelength of 550 nm, is set in a range of not less than 0.975 and not more than 1.

By satisfying at least one of the above fourth through sixth conditions, it is possible to provide an image without any coloration in any direction in a viewing angle of 70° which is a required viewing angle in a wide-viewing-angle liquid crystal display device.

Also, in the same manner as above, in the case of adopting a phase difference plate whose three principal refractive indices $n_a$, $n_b$, and $n_c$ are related to each other by the relation $n_a = n_c > n_b$, and in which the principal refractive index $n_b$ is inclined with respect to the direction normal to the surface of the phase difference plate, it is preferable that the refractive index anisotropy $\Delta n(550)$ for the light having a wavelength of 550 nm is set in a range of more than 0.060 and less than 0.120.

This is because when the refractive index anisotropy $\Delta n(550)$ for the light having a wavelength of 550 nm, which is in the middle of the visible light range, is not more than 0.060 or not less than 0.120, it was found that the reversion phenomenon and lowering of contrast are generated depending on the viewing direction. Thus, by setting the refractive index anisotropy $\Delta n(550)$ for the light having a wavelength of 550 nm in a range of more than 0.060 and less than 0.120, it is possible to eliminate the phase difference generated in the liquid crystal display element in accordance with viewing angles, thereby making it possible to suppress not only the viewing-angle-dependant coloration phenomenon generated on the liquid crystal screen but also a change in contrast and the reversion phenomenon in the left and right directions, etc.

Further, by setting the refractive index anisotropy Δn(550) for the light having a wavelength of 550 nm in a range of not less than 0.070 and not more than 0.095, it is possible to eliminate even more effectively the phase difference generated in the liquid crystal display element in accordance with viewing angles, thereby ensuring that a change in contrast of the liquid crystal display image, the reversion phenomenon in the left and right directions, and the coloration phenomenon are further suppressed.

Furthermore, when adopting the above-mentioned phase difference plate, by satisfying the following seventh through ninth conditions, it is ensured that the compensation function of the phase difference plates for compensating the phase difference is obtained.

The seventh condition: In the described phase difference plates, the tilt-angle of the refractive index ellipsoids is set in a range of 15° and 75°.

The eighth condition: In the described phase difference plates, respective rubbing directions of the alignment layers provided on the pair of translucent substrates are respectively substantially parallel to planes, on each side of the pair of translucent substrates, respectively made by (1) a direction of the principal refractive index $n_b$ of each of the phase difference plates and (2) the direction normal to the surfaces of the phase difference plates.

The ninth condition: In the described phase difference plates, a product of (a) a difference of the principal refractive index $n_a$ and the principal refractive index $n_b$ and (b) a thickness d of the phase difference plate, $(n_a-n_b) \times d$, is set in a range of 80 nm and 250 nm.

Also, when such a phase difference plate is adopted which is prepared (1) by tilt-aligning or hybrid-aligning discotic liquid crystal on a support base made of a transparent organic polymer and (2) by crosslinking of the discotic liquid crystal to each other, it is possible to prepare a refractive index ellipsoid of the phase difference plate, which is inclined with respect to the phase difference plate with certainty.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
a pair of translucent substrates, each provided with a transparent electrode layer and an alignment layer on a surface facing the other substrate;
a liquid crystal layer made of a liquid crystal material whose change in refractive index anisotropy in accordance with a wavelength of light is set in a range which does not allow viewing-angle-dependant coloration to generate on a liquid crystal screen;
a liquid crystal display element composed of said pair of translucent substrates and said liquid crystal layer;
a pair of polarizers provided on both sides of said liquid crystal display element; and
phase difference plates, provided at least one, respectively positioned between said liquid crystal display element and said pair of polarizers.

2. A liquid crystal display device comprising:
a pair of translucent substrates, each provided with a transparent electrode layer and an alignment layer on a surface facing the other substrate;
a liquid crystal layer made of a liquid crystal material whose change in refractive index anisotropy in accordance with a wavelength of light is set in a range which does not allow viewing-angle-dependant coloration to generate on a liquid crystal screen;
a liquid crystal display element composed of said pair of translucent substrates and said liquid crystal layer;
a pair of polarizers provided on both sides of said liquid crystal display element; and
phase difference plates, provided at least one, respectively positioned between said liquid crystal display element and said pair of polarizers, wherein said phase difference plates have three principal refractive indices $n_a$, $n_b$, and $n_c$ related to each other by a relation $n_a=n_c>n_b$, the principal refractive index $n_b$ being inclined with respect to a direction normal to surfaces of said phase difference plates.

3. The liquid crystal display device as set forth in claim 2, wherein alignment layers are subjected to a rubbing process so that a twist angle of liquid crystal molecules of the liquid crystal material is aligned by substantially 90°.

4. The liquid crystal display device as set forth in claim 3, wherein each of said pair of polarizers has an absorption axis parallel to a rubbing direction of a closer ene of the alignment layers provided on said pair of translucent substrates.

5. The liquid crystal display device as set forth in claim 2, wherein a difference Δn(450)–Δn(650) of the liquid crystal material of the liquid crystal layer, between refractive index anisotropy Δn(450) for light having a wavelength of 450 nm and refractive index anisotropy Δn(650) for light having a wavelength of 650 nm is set in a range of not less than 0 and less than 0.010.

6. The liquid crystal display device as set forth in claim 5, wherein the difference Δn(450)–Δn(650) of the liquid crystal material of the liquid crystal layer, between the refractive index anisotropy Δn(450) for light having a wavelength of 450 nm and the refractive index anisotropy Δn(650) for light having a wavelength of 650 nm is set in a range of not less than 0 and not more than 0.0055.

7. The liquid crystal display device as set forth in claim 5, wherein the refractive index anisotropy Δn(550) for light having a wavelength of 550 nm is set in a range of more than 0.060 and less than 0.120.

8. The liquid crystal display device as set forth in claim 7, wherein the refractive index anisotropy Δn(550) for light having a wavelength of 550 nm is set in a range of not less than 0.070 and not more than 0.095.

9. The liquid crystal display device as set forth in claim 2, wherein a ratio Δn(450)/Δn(550) of the liquid crystal material of the liquid crystal layer, which the ratio of (a) the refractive index anisotropy Δn(450) for the light having a wavelength of 450 nm to (b) refractive index anisotropy Δn(550) for the light having a wavelength of 550 nm, is set in a range of not less than 1 and less than 1.07.

10. The liquid crystal display device as set forth in claim 9, wherein the ratio Δn(450)/Δn(550) of the liquid crystal material of the liquid crystal layer, which the ratio of (a) the refractive index anisotropy Δn(450) for the light having a wavelength of 450 nm to (b) the refractive index anisotropy Δn(550) for the light having a wavelength of 550 nm, is set in a range of not less than 1 and not more than 1.05.

11. The liquid crystal display device as set forth in claim 9, wherein the refractive index anisotropy Δn(550) for light having a wavelength of 550 nm is set in a range of more than 0.060 and less than 0.120.

12. The liquid crystal display device as set forth in claim 11, wherein the refractive index anisotropy Δn(550) for light having a wavelength of 550 nm is set in a range of not less than 0.070 and not more than 0.095.

13. The liquid crystal display device as set forth in claim 2, wherein a ratio $\Delta n(650)/\Delta n(550)$ of the liquid crystal material of the liquid crystal layer, which the ratio of (a) the refractive index anisotropy $\Delta n(650)$ for the light having a wavelength of 650 nm to (b) the refractive index anisotropy $\Delta n(550)$ for the light having a wavelength of 550 nm, is set in a range of more than 0.96 and not more than 1.

14. The liquid crystal display device as set forth in claim 13, wherein the ratio $\Delta n(650)/\Delta n(550)$ of the liquid crystal material of the liquid crystal layer, which the ratio of (a) the refractive index anisotropy $\Delta n(650)$ for the light having a wavelength of 650 nm to (b) the refractive index anisotropy $\Delta n(550)$ for the light having a wavelength of 550 nm, is set in a range of not less than 0.975 and not more than 1.

15. The liquid crystal display device as set forth in claim 13, wherein the refractive index anisotropy $\Delta n(550)$ for light having a wavelength of 550 nm is set in a range of more than 0.060 and less than 0.120.

16. The liquid crystal display device as set forth in claim 15, wherein the refractive index anisotropy $\Delta n(550)$ for light having a wavelength of 550 nm is set in a range of not less than 0.070 and not more than 0.095.

17. The liquid crystal display device as set forth in claim 2, wherein the refractive index anisotropy $\Delta n(550)$ for light having a wavelength of 550 nm is set in a range of more than 0.060 and less than 0.120.

18. The liquid crystal display device as set forth in claim 17, wherein the refractive index anisotropy $\Delta n(550)$ for light having a wavelength of 550 nm is set in a range of not less than 0.070 and not more than 0.095.

19. The liquid crystal display device as set forth in claim 2, wherein a tilt-angle of refractive index ellipsoids of said phase difference plates is set in a range of 15° and 75°.

20. The liquid crystal display device as set forth in claim 2, wherein respective rubbing directions of the alignment layers provided on said pair of translucent substrates are respectively substantially parallel to directions respectively made on each side of said pair of translucent substrates by projecting the principal refractive index $n_b$ of each of said phase difference plates on a surface thereof.

21. The liquid crystal display device as set forth in claim 2, wherein in each of said phase difference plates, a product of (a) a difference of the principal refractive index $n_a$ and the principal refractive index $n_b$ and (b) a thickness d of the phase difference plate, $(n_a-n_b)\times d$, is set in a range of 80 nm and 250 nm.

22. The liquid crystal display device as set forth in claim 2, wherein said phase difference plates are prepared (1) by tilt-aligning discotic liquid crystal on a support base made of a transparent organic polymer and (2) by crosslinking the discotic liquid crystal to each other.

23. The liquid crystal display device as set forth in claim 2, therein said phase difference plates are prepared (1) by hybrid-aligning discotic liquid crystal on a support base made of a transparent organic polymer and (2) by crosslinking the discotic liquid crystal to each other.

* * * * *